July 22, 1969
W. B. TEMPLETON
3,456,772
LINE FIND APPARATUS
Filed April 13, 1966
5 Sheets-Sheet 1
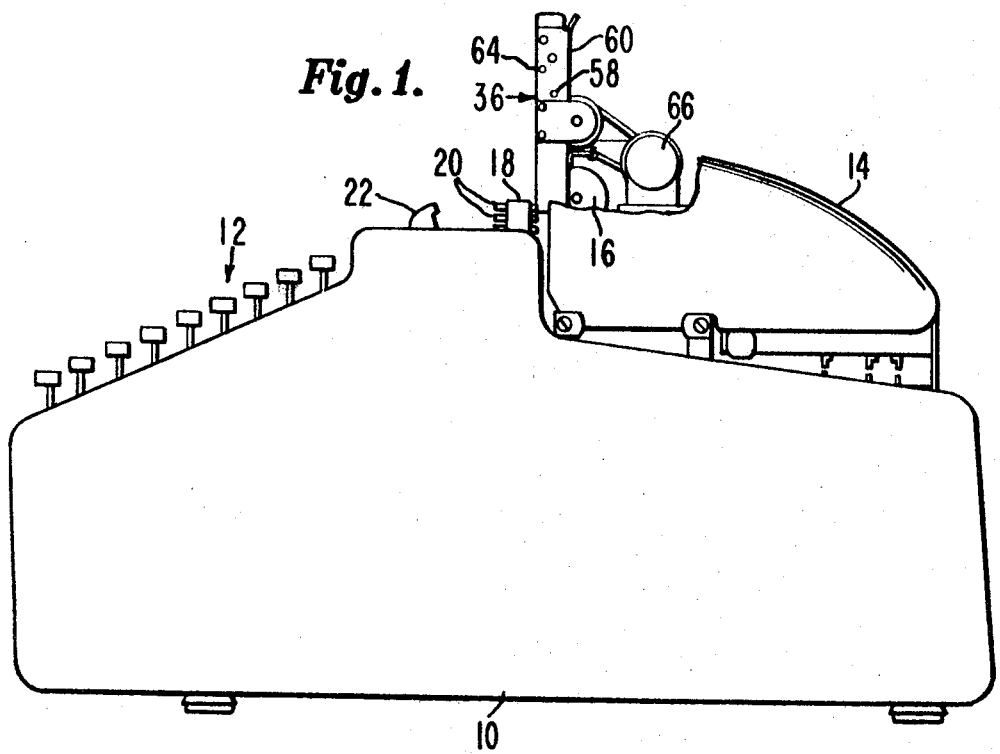
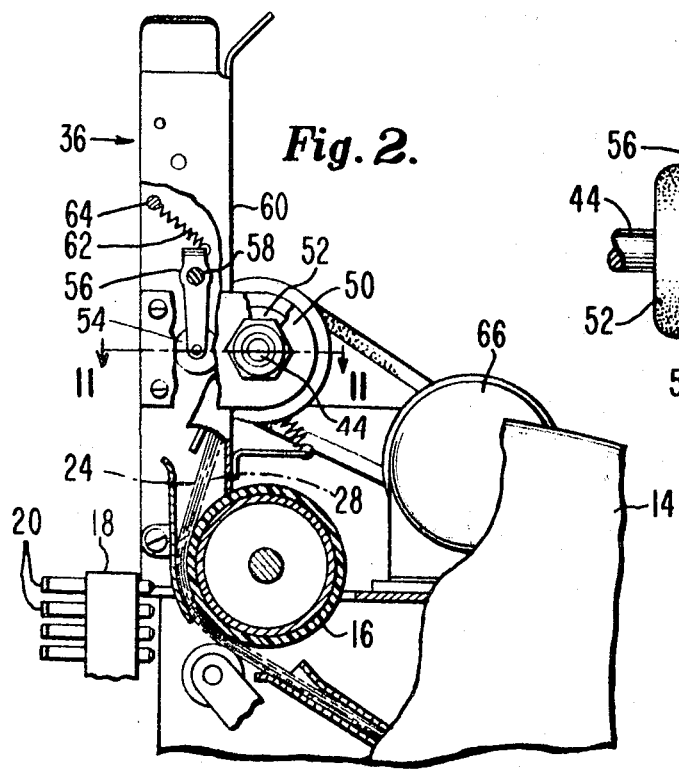
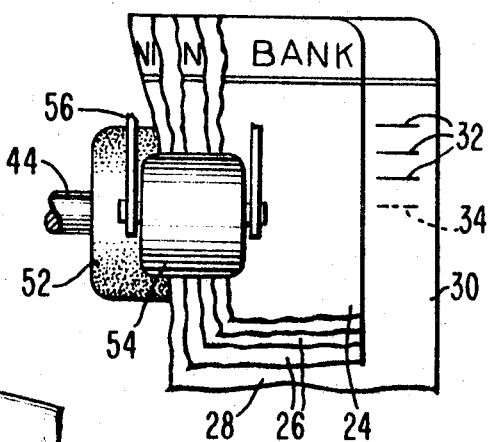
INVENTOR.
WILLIAM B. TEMPLETON.
BY
ATTORNEY.

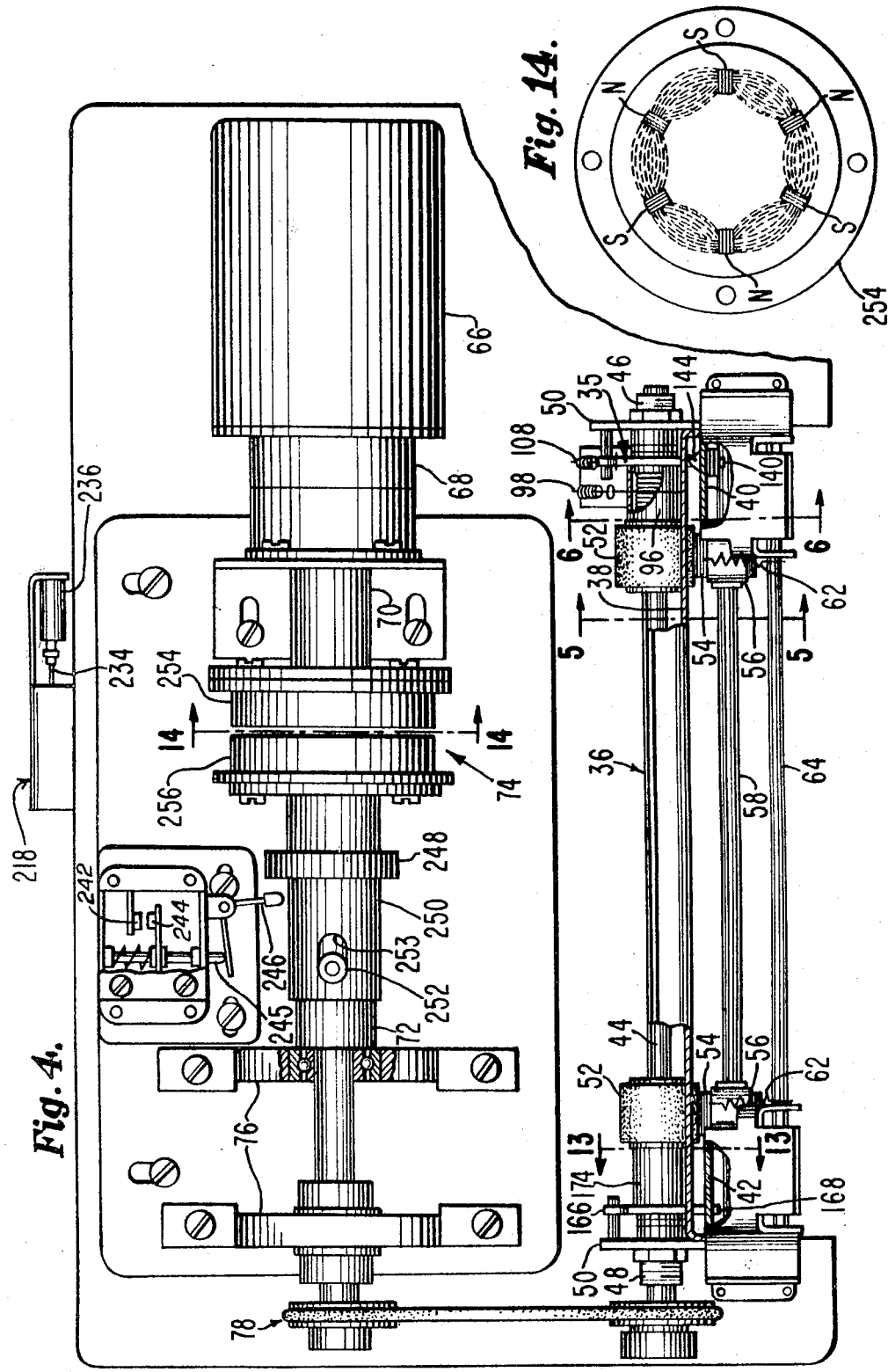

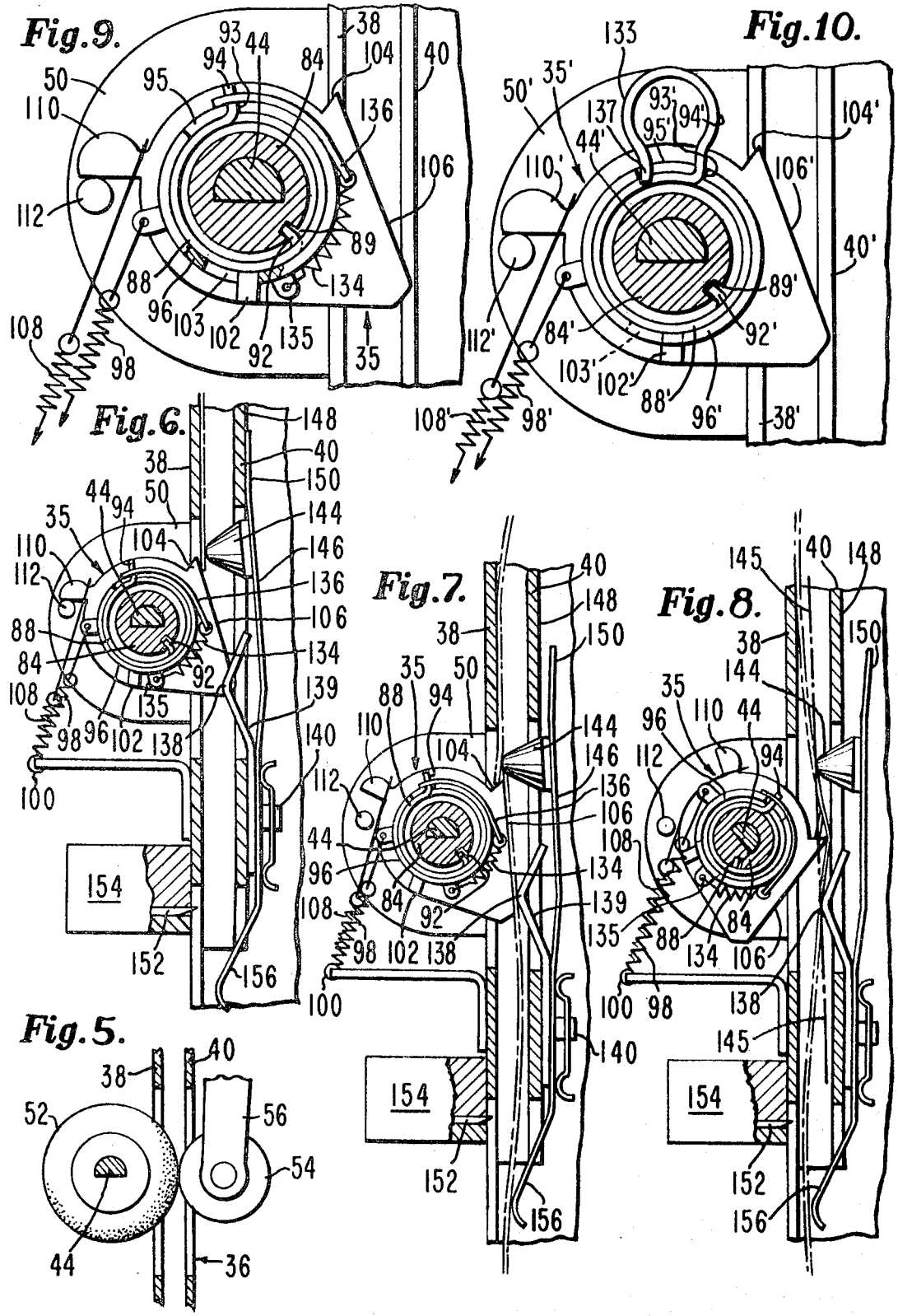

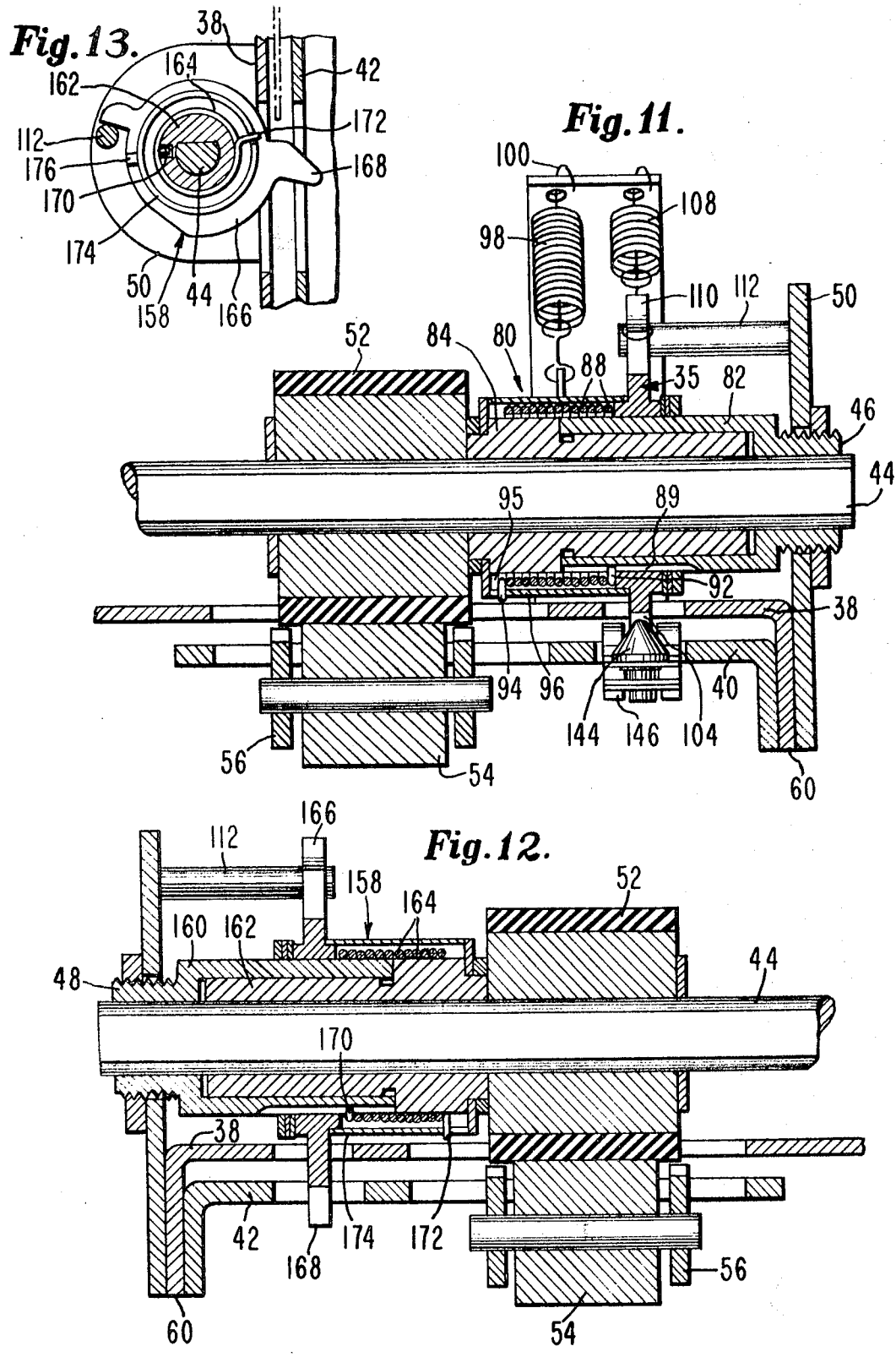

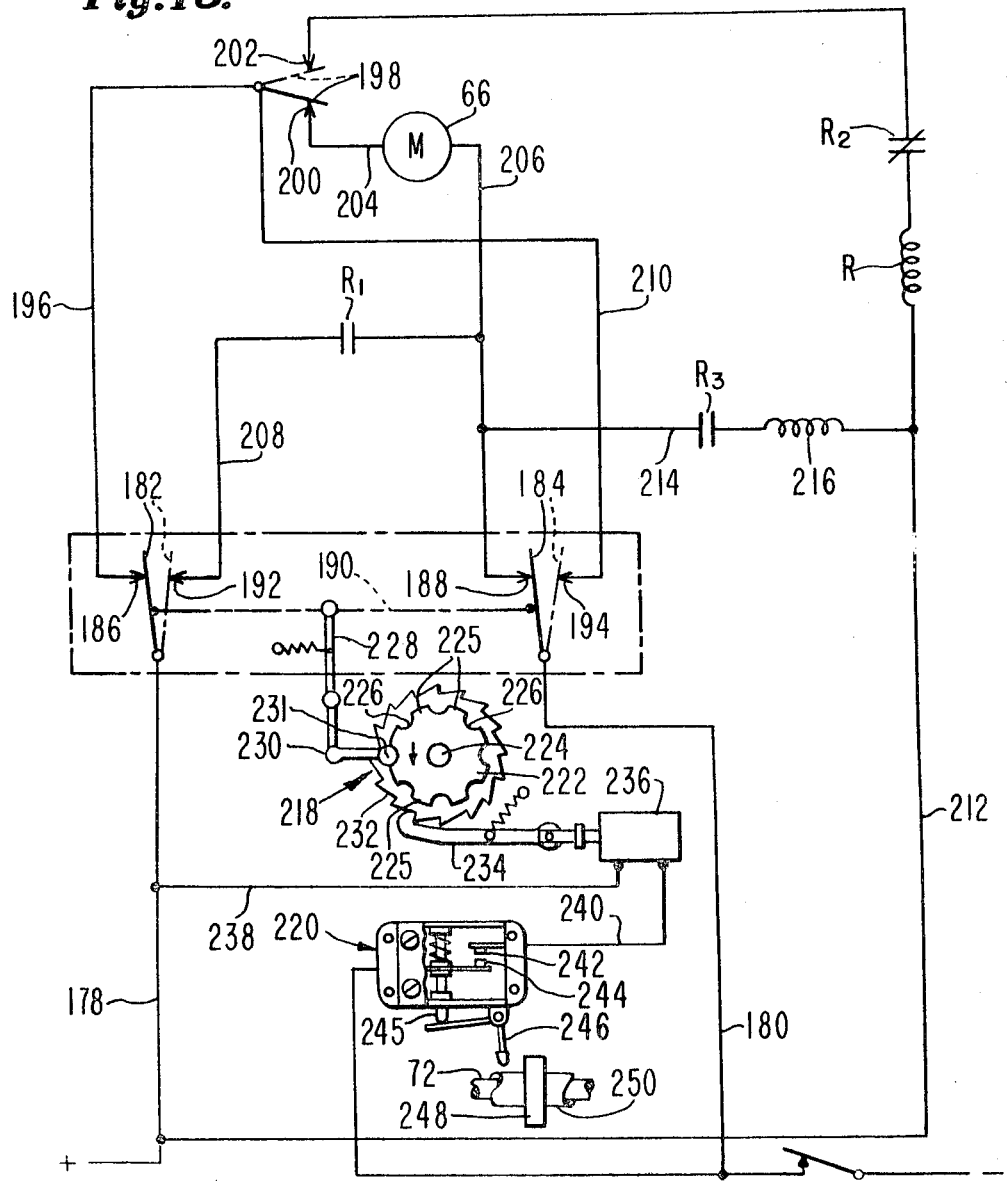
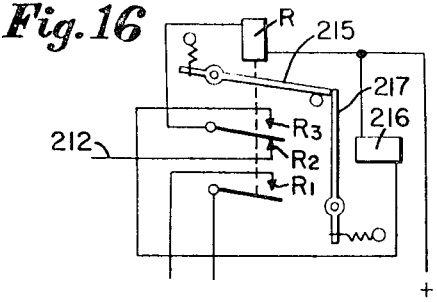
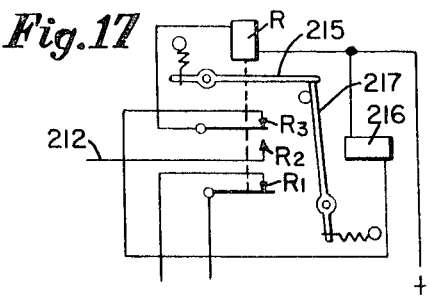

United States Patent Office 3,456,772
Patented July 22, 1969

3,456,772
LINE FIND APPARATUS
William B. Templeton, Northville, Mich., assignor to Burroughs Corporation, Detroit, Mich., a corporation of Michigan
Filed Apr. 13, 1966, Ser. No. 542,715
Int. Cl. B41j 13/26
U.S. Cl. 197—127          3 Claims

ABSTRACT OF THE DISCLOSURE

The disclosure embodies a record sheet handling apparatus including mechanism to feed a record sheet to a platen for processing and thereafter feeding the sheet in a reverse direction or ejecting the sheet. The feeding mechanism is driven by a reversible electric motor and the direction of feed is controlled through alternately selective control circuits by a switch actuator driven by the motor. A line find mechanism has an actuator which responds to a next available unused line designation on a record sheet being fed to the platen, and the actuator initiates operation of a brake to stop the sheet. The application of the brake initiates movement of a switch operator which selects the motor reversing circuit and shuts off the motor. The brake includes a coil spring which surrounds a motor driven shaft and a stationary shaft, and the spring is normally held in a radially expanded disengaged state under a retractile tension force. The motor is connected to the driven shaft by a slip clutch, and the slipping action effected by application of the brake results in movement of the actuator to select the reverse motor circuit. The reverse motor circuit is not effective until a circuit control switch is operated.

---

The invention resides in the provision of an improvement in a line find mechanism brake of the type in which a coil spring is normally held radially expanded by a yieldable force applied at one end of the spring. The improvement comprises an additional spring which acts on the coil brake spring when the latter is allowed to contract, the added spring acting to wind the brake spring to insure application of all convolutions of the latter to effect uniform braking action.

This invention relates generally to business machines and particularly to the feed and stopping of record sheets processed by such machines.

An object of the invention is to provide a line find sheet feed mechanism wherein a helical spring brake member which is normally exerting contractile force is releasable by a sheet operated arm with the assurance that all convolutions of the spring brake member will effectively be applied to the braking action.

Other objects of the invention will become apparent from the following description, taken in connection with the accompanying drawing, in which:

FIG. 1 is a side view of an accounting machine embodying features of the invention;
FIG. 2 is an enlarged fragmentary side view;
FIG. 3 is a fragmentary front view of certain details:
FIG. 4 is a fragmentary plan view;
FIG. 5 is a vertical sectional view, taken along the line 5—5 of FIG. 4;
FIG. 6 is an another vertical sectional view, taken along the line 6—6 of FIG. 4;
FIGS. 7 and 8 are vertical sectional views, similar to FIG. 6 showing the progress of a record sheet in relation to a line find mechanism;
FIG. 9 is an enlarged vertical sectional view similar to FIG. 6;
FIG. 10 is a view similar to FIG. 9 of a modification;
FIG. 11 is a horizontal fragmentary sectional view, taken along the line 11—11 of FIG. 2 at the rightward side of the machine;
FIG. 12 is a fragmentary horizontal sectional view similar to FIG. 11 and taken at the leftward side of the machine;
FIG. 13 is a vertical sectional view, taken along the line 13—13 of FIG. 4;
FIG. 14 is an end view, taken along the line 14—14 of FIG. 4;
FIG. 15 is a diagrammatic view of a control system;
FIG. 16 is an elevational view of a relay and latch therefor shown in an unlatched state; and
FIG. 17 is a view similar to FIG. 16, showing the latched state.

Referring to the drawing by characters of reference, the business machine of FIG. 1 may be of any well known type for processing record sheets or cards, such as the printing of amounts in columns, and the machine is illustrated as including a housing 10, a keyboard 12 and an encased carriage 14. Mounted on the carriage 14 there is the usual roller type platen 16 and forwardly of the platen 16 there is a print head 18 having a plurality of print elements 20 and a plurality of print hammers 22, of which only one is shown. As is well known in the operation of machines of the type illustrated, an amount to be printed is indexed by means of the keyboard 12 and upon depressing the well known motor bar, a machine cycle of operation is initiated which includes the vertical positioning of the print head 18, in accordance with the indexed amount, followed by operation of the print hammers 22 to drive the selected ones of the print elements 20 against the platen 16.

The above generally described printing mechanism is part of a well known conventional accounting machine for a more complete understanding of the details of the accounting mechanisms of such machines, reference may be had to the patent to Thomas M. Butler, No. 2,629,549, issued Feb. 24, 1953 for Automatic Function Control Mechanism For Accounting Machines.

Although the accounting machine is adapted to handle record sheets singly as disclosed in the aforementioned Butler patent it is also adapted to handle a pack of sheets, as illustrated in FIGS. 2 and 3, the pack including a first or original sheet 24, and several copy sheets 26 attached together and to a backing sheet 28. A rightward margin 30 of the backing sheet 28 projects beyond the rightward side edges of the record sheets 24 and 26 and in said margin 30 there is shown a number of vertically spaced horizontal slits 32. These slits 32 are indicative of printed lines on the record sheets 24 and 26. The next available unused line is indicated in dot and dash lines, as at 34, in FIG. 3. The slits 32, 34 are alike and are preferably made with a slitting tool 152, as shown in FIGS. 6, 7 and 8 and of the type that also spreads the slit 34 such that the upper edge of the slit 34 projects out of the plane of the backing sheet 28 in position for abutting a brake control or operator 35 in connection with the operation of a hereinafter described line find device.

A vertical sheet guideway structure, designated generally by the numeral 36, is suitably mounted on the carriage 14 above the platen 16 and may include a rear guide member or plate 38 and a pair of front, laterally spaced apart sheet guide members 40 and 42. Spaced from and behind the rear guide plate 38 there is a horizontal driven shaft 44 journaled in end bearings 46 and 48 which are rigidly mounted on the guide plate 38 by brackets 50. Affixed onto the driven shaft 44 between the guide members 40 and 42 there is a pair of axially spaced apart feed rollers 52 cooperable respectively with a pair of pressure rollers 54 to feed the pack of record sheets 24, 26, 28 along the guideway 36, the feed and pressure rollers 52 and 54 projecting into and forming bights within the guideway 36. The pressure rollers 54 are rotatably mounted on the lower ends of U-shaped levers 56, pivoted adjacent their upper ends on a horizontal rod 58 which has its opposite ends secured in and to side flanges 60 of guide plate 38. As shown in FIGS. 2 and 4 a pair of springs 62 urge the pressure rollers 54 into contact with the feed rollers 52, the spring 62 being anchored to a cross rod 64 and attached respectively to upper connecting webs of the U-shaped levers 56.

A direct current reversible electric motor 66 is provided to drive the feed rollers 52, and connected to the motor drive shaft there is a conventional speed reduction mechanism in a housing 68. Projecting from the housing 68 there is a driving shaft 70 coaxially aligned with a driven shaft 72 and coupled thereto by a magnetic clutch 74. The shaft 72 is journaled in a pair of spaced apart mountings 76 and drives shaft 44 through belt and pulley drive connections 78.

A brake, designated generally by the numeral 80, is provided to stop the feed rollers 52 and is mounted on and adjacent the rightward side of the sheet guideway member 38. With reference to FIG. 11, the brake 80 comprises a stationary brake drum 82, a rotatable brake drum 84, and the brake control or operator 35. As shown, the brake drums 82 and 84 are tubular in form to receive the feed roller shaft 44, the stationary drum 82 being integral with bearing 46 and affixed to the sheet guideway structure 36, and the drum 84 being affixed to the shaft 44. The outer peripheries of the brake drums 82 and 84 are flush and surrounding both of them is a helical spring brake member 88. One end of the helical brake member 88 is provided with a laterally projecting tang 92 engaging in a retaining slot 89 in the stationary drum 82 and the other end of the helical brake member 88 is provided with a similar tang 94 which is engaged by an abutment or end 93 of a circumferentially extending slot 95 in a rotatable sleeve 96 which surrounds the brake member 88. The end of the slot 95, opposite the end 93, provides a second abutment to engage the tang 94, and the distance between the ends of the slot 95 provide a lost-motion connection between the brake spring tang 94 and the sleeve 96. The helical brake member 88 is normally held expanded in brake released position by a stronger spring 98 which has one end anchored, as at 100, and the other end attached to the rotatable sleeve 96, as shown, for example, in FIGS. 9 and 11. As shown, the spring 98 is urging the sleeve 96 counterclockwise and through abutment 93 is holding the helical brake member 88 expanded.

The brake operator 35 is rotatably mounted on the stationary brake drum 82 and has a laterally projecting abutment 102 engaging in a slot 103 in the sleeve 96 such that rotation of the brake operator 35 in a clockwise direction, as seen in FIG. 9, will overcome the spring 98 and allow the helical brake member 88 to contract and thus effect a braking action against and stop the brake drum 84. The slot 103 provides a lost-motion connection between the brake operator 35 and the sleeve 96, the length of the slot 103 being substantially equal to the lenth of the slot 95. Normally, the abutment 102 of the brake operator 35 is adjacent the rightward end of the slot 103, as shown in FIG. 9. The brake operator 35 is preferably made of a suitable flat sheet material with an outer periphery contoured to provide a projection 104 for engagement by the upper edge of a line designated slit 34 in the backing sheet 28, fed down the guideway 36. Extending downwardly from the point of the projection 104, the periphery of the brake operator 35 is provided with a sheet abutment, preferably a straight edge flat portion 106 which normally extends downwardly and forwardly across the guideway 36. The angularly disposed flat portion 106, functioning as a cam, is engaged by the leading edge of the backing sheet 28 fed downwardly by the feed rollers 52 which pivots the brake operator 35 from its normal position, with the projection 104 without the guideway 36, to a position within the guideway 36 as shown in FIG. 7. In the latter position of the brake operator 35, it will be noted that its projection 104 is in position for abutment by an upper edge of the line designating sheet slit 34. The circumferentially extending slot 103, receiving the abutment 102 of the brake operator 35, provides a lost-motion connection between the brake operator 35 and sleeve 88 so that the brake operator 35 is movable to its effective position shown in FIG. 7 without application of the helical brake member 88. A return spring 108 is connected to an arm 110 of the brake operator 35 and is operable to return the latter to its normal retracted position against a stop member 112. In order to reduce wear of the cam portion 106 by sheets fed therealong, the cam portion 106 may be coated with a plastic material having a low coefficient of friction with accompanying long wearing characteristics, such as a plastic material of the nature of Teflon. This plastic may be coated on the cam portion 106 or, if desired, the brake operator 35 may be made in its entirety of Teflon or a similar plastic material.

In accordance with the invention, a force exerting means or helical coil spring 134 is provided to supplement the brake engaging action to assure substantially equidistant spacing of printed lines on a sheet. As shown in FIG. 9, the spring 134 is connected at one end thereof to a lug 135 on the sleeve 96 and has its other end connected to one end of a strap 136. From the lug 135, the spring 134 and strap 136 extend part way around the sleeve 96 in a counterclockwise direction, as viewed in FIG. 9, and the strap 136 is connected to the tang 94 such that the spring 134 tends to wind the helical spring brake member 88 in a contractile direction. The backing sheet 28, moving downwardly in the guideway, engages the edges 106 of the brake operator 35 and rotates the latter to its effective position shown in FIG. 7. In this position, it will be seen that the brake operator 35 has rotated relative to the sleeve 96 which remained in its unactivated position by reason of the lost-motion connections including the slot 103 and the abutment 102. The abutment 102 is now adjacent the leftward end of the slot 103. When the slit 34 in the backing sheet 28 engages the extension 104, the sheet feeding roller 52 acting against the sheet 28, overcomes the spring 98 and rotates the brake operator 35 and the sleeve 96 together by means of the abutment 102 in a clockwise direction. The brake operator 35 is now in the position shown in FIG. 8. To accomplish this, the force of the sheet feed roller 52 overcomes the spring 108 thereby releasing the helical brake member 88 which then contracts about the brake drums 82 and 84, applying the braking force to stop the brake drum 84. It will be noted by reference to FIG. 8 that the lost-motion connection provided by the slot 95 and the tang 94 allowed for relative rotation between the sleeve 96 and the tang 94 following the braking action, the abutment 93 moving away from the tang 94, as shown. This permitted the tensioned supplemental spring 134 to apply a winding force to the free end of the helical brake member 88 to take up slack and thereby effect a more uniform braking force throughout its length. Although the above points out the utility of the spring 134 in providing a supplemental torsional force to the free end of the helical brake member 88 to take up any existing slack, there is another condition that occurs where the free end of the brake spring 88 and adjacent coils of the spring 88 may not contract tightly against the brake drums 82 and 84. This condition exists where over a period of time grease and dust collecting on the coils of the helical brake member 88 oppose the contractile force thereof. This becomes evident by the fact that the free end of the helical brake member 88 does not follow rotation of the sleeve 96 in the absence of the supplemental spring 134.

A modification of the supplemental brake operation is shown in FIG. 10 wherein like parts have been given primed numerals to avoid unnecessary repetitious description. The modification differs from the preferred form in that the supplemental spring, as at 133, is a reversely bent looped end extension of the tang 94'. An end portion 137 of the spring 133 extends into the slot 95' in abutting relation with the end of the slot 95' opposite the end 93' engaged by the tang 94'. Thus, it will be understood that on release of the helical brake member 88' the accompanying rotation of the sleeve 96' will tension the spring loop 133 in a direction to wind the helical brake member 88' in a contractile direction against the brake drums. With respect to the specific detail operation of the above it will be understood that when a backing sheet 28 is fed down the guideway of FIG. 10, the sheet 28 engages cam 106' and rotates the brake operator 35' in a clockwise direction until abutment 102' in slot 103' engages the leftward end of the slot 103'. The brake operator 35' has now been rotated relative to the sleeve 96' so as to position extension 104' in the sheet guideway. When a slit 34 in the backing sheet 28 engages the extension 104', the sheet feed roller 52 overcomes the spring 98' and the brake operator 35' is further rotated clockwise and through the abutment 102' against the leftward end of slot 103' rotates the sleeve 106' clockwise. Because of the slackness in the spring coils of and near the free end of the helical brake member 88' or because of grease in the coils or both, the free end of the helical brake member 88' cannot be relied upon to follow the end 93' of the sleeve 96' as the latter is rotated clockwise during the brake release operation. However, this objection is overcome by the provision of the spring 133 carried by and on the free end of the helical brake member 88'. For example, when the sleeve 96' is rotated clockwise, the spring 133 is immediately tensioned and this spring force is acting to force the free end of the helical brake member 88' to follow the slot end 93'. Just prior to the full application of the brake, the slot end 93' of the sleeve 96' moves away from the free end of the helical brake member 88' so that the sleeve 96' will not inhibit free contraction about the drums 82 and 84 of the helical brake member 88' when the latter is supplemented by spring 133.

Rigidly mounted on the rightward sheet guide member 40 there is an abutment member 138 which projects into the sheet guideway posteriorly of the brake operator projection 104 with respect to downward feeding of a sheet. The abutment 138 and the brake operator projection 104 are in alignment and overlie the path of travel of the backing sheet margin 30 containing the line designating slits 32. In the present construction, the abutment 138 is provided by forming a bend in an upright rigid strip 139 of metal or other suitable material, secured to the guideway member 40 by a screw 140, or other suitable securing means such that the abutment 138 is stationary. The bend or abutment 138 presents a convex surface for engagement by the margin 30 of the backing sheet 28, the abutment 138 being closer to the sheet guide member 40 than to the sheet guide plate 38. An upper portion of the metal strip 139 extends forwardly to pilot the leading edge of a sheet to the abutment 138 as shown in FIG. 6. Above or anteriorly of the brake operator projection 104 there is a movable abutment 144 in vertical alignment with the projection 104 and with the stationary abutment 138. The upper abutment 144 functions to guide a sheet 28 to the projection 104 and to spread the sheet slit 34 to assure abutment of the upper edge of the slit 34 against the projection 104, as the slit edges may be pressed closed by the pressure of sheet stacking. Preferably, the upper abutment member 144 is of conical configuration and the base thereof is secured to a leaf spring 146 near the upper end thereof, the spring 146 being secured to the guideway member 40 by means of the screw 140. The sheet engaging end of the conical abutment 144 is preferably rounded, as shown, and is positioned proximate the inner surface of the rear guideway member 40 such that a sheet 28 passing down the guideway will cam the abutment 144 forwardly and tension the leaf spring 146. The tension force stored in the spring 146 by the sheet 28 is used to spread the last punched slit 34 of a sheet 28. A stop member 148 on the guideway member 40 is engaged by an upper extension 150 of the leaf spring 146 to space the abutment 144 from the inner face of the guideway member 38 a distance less than the thickness of a record sheet 24.

In operation of the line find device, a record sheet 24 or pack of sheets 24, 26, 28 is fed downwardly in the sheet guideway by the feed rollers 52 and the leading edge of the backing sheet 28 strikes the inclined edge 106 of the brake operator 35 and pivots the latter clockwise as viewed, for example, in FIG. 6. The backing sheet 28 rotates the brake operator sheet abutment 104 from its retracted ineffective position of FIG. 6 to its effective position projecting into the guideway, as shown in FIG. 7. In this position of the brake operator 35, it will be seen that the spring 108 has been additionally tensioned and is thrusting the flat portion 106 of the brake operator 35 against the sheet 28 and the sheet 28 against the rounded fixed abutment 138. Because of the lost-motion connection of the operator abutment 102 and the sleeve slot 103, which are best shown in FIG. 5, rotation of the brake operator 35 to the position shown in FIG. 7 does not effect brake operation, the abutment 102 merely moving to the other end of the slot 103. Also, the backing sheet 28, engaging the abutment 144 has tensioned the leaf spring 146 and when the last slit 34 in the sheet 28 is opposite the abutment 144, the tension force of the spring 146 spreads the slit 34 to assure that the upper edge of the slit 34 will engage the brake operator abutment 104 and further rotate the brake operator 35 in a clockwise direction. On said further rotation of the brake operator 35, the operator abutment 102 engages and rotates the sleeve 96 to effect application of the brake member 88. With reference, particularly to FIG. 8, it will be seen that the ends of the yieldable abutment member 144 and the fixed abutment member 138 are in a plane, represented by the dot and dash line 145 and on the other side of the plane 145 is the brake operator 35 in brake operating position. In moving to this position from FIG. 7, the brake operator abutment 104 bows and thus tensions the backing sheet 28 to maintain engagement between the slit edge and the abutment 104, the abutment 104 coming to rest on the same side of the plane 145 as the abutments 144 and 138.

Below the stationary abutment 138 there is a sheet slitting tool 152 mounted on the guideway member 38 in a suitable casing 154. The slitting tool 152 may be electrically operated by the use of a solenoid (not shown) or by any other well known suitable means. The leaf spring 146 has a lower rigid end portion 156 which extends rearwardly and downwardly across the guideway to provide a sheet back-up member for the slitting operation.

Mounted on the leftward sheet guideway member 42 there is a second sheet operated brake, designated generally by the numeral 158 which functions, as will be hereinafter more fully understood, to activate a control system to effect a reverse operation of the sheet feed motor 66 so as to eject a sheet 28 from the platen 16. The brake 158, as shown in FIGS. 12 and 13, is similar to the previously described brake 80 in having a stationary brake drum 160, a rotatable brake drum 162 and a helical spring brake member 164. The stationary brake drum 160 is mounted on the guideway member 42 and is tubular to receive the feed roller shaft 44 and a reduced end portion of the rotatable drum 162 which is affixed onto the shaft 44. The spring brake member 164 surrounds the drums 160 and 162 and is normally contracted thereabout in brake applied gripping relation with the drums 160 and 162, as shown. A brake operator 166 is rotatably mounted on the stationary drum 160 and may be made of plate or sheet stock having an arm 168 which normally projects into the sheet guideway for engagement by the leading edge of a record sheet 24 being fed downwardly to the platen 16. One end of the spring brake member 164 is provided with a tang 170 which engages in a notch in the stationary brake drum 160. The other end of the spring brake member 164 is provided with a similar tang 172 which engages in an aperture in a rotatable connecting member or sleeve 174, journaled for rotation on the sheet guideway member 42. A lug 176 on the brake operator 166 engages in a circumferentially extending slot in the sleeve 174 to effect operative connection between the brake operator 166 and the spring brake member 164. The leading edge of a sheet 28 moving down the guideway engages the arm 168 and rotates the operator 166 clockwise, as viewed in FIG. 13, which rotates the sleeve 174 in like direction, and the sleeve 174, acting against the spring tang 172, expands the spring 164 to effect brake disengagement. It will be understood that on ejection of a sheet 28, the brake 158 will be applied as the trailing edge of a sheet 28 releases the brake operator 166.

Referring now to the diagrammatical illustration of FIG. 15, the numerals 178 and 180 designate the main leads of a D.C. electric power source and connected respectively to the main leads 178 and 180 are two movable switch members 182 and 184. The movable switch members 182 and 184 are shown in full lines in the positions they assume for the feeding of a record sheet 24 to the platen 16 in which positions they respectively engage a pair of fixed contact members 186 and 188. The switch members 182 and 184 are connected for movement together, as indicated at 190, to another pair of fixed contacts 192 and 194 respectively. These switches are provided for the purpose of conditioning the direction of drive by the D.C. electric motor 66. The switch contact member 186 is connected by a lead 196 to another switch member 198 which is cooperable with one or the other of a piar of fixed contact members 200 and 202, the switch contact member 198 being in engagement with contact member 200 which is connected by a lead 204 to one terminal of the motor 66. A lead 206 connects another terminal of the motor 66 to the fixed contact member 188, engaged by the switch member 184. The switch contact member 192 is connected by a lead 208 to lead 206 and thus is connected to the motor 66, and another lead 210 connects the switch member 198 to the fixed contact member 194. When the switch members 182 and 184 are in the position shown, a circuit to effect a sheet feeding operation of motor 66 is completed from the positive source of power through lead 178, switch contact members 182, 186, lead 196, switch contact members 198, 200, motor 66, lead 206, switch contact members 188, 184 and through lead 180 to the negative or ground terminal. When the switch members 182 and 184 are in engagement with their fixed contact members 192 and 194, a circuit is completed from the source of power through lead 178, switch contact members 182, 192, leads 208, 206, motor 66, lead 204, switch contact members 200, 198, lead 210, switch contact members 194, 184 and through lead 180 to ground.

A relay coil R is provided in a lead 212 which connects switch member 198 to the positive side or lead 178. The relay coil R has a pair of normally open contact members R1 in lead 208 and a pair of normally closed contact members R2 in lead 212. Also, the relay coil R has pair of normally open contact members R3 in a lead 214 that connects leads 206 and 212 and thus connects the contact member 188 to the plus side or main lead 178. The relay coil R is of the well known type which, when energized, has its clapper 215 mechanically latched against movement away from the coil R by the clapper 217 of a relay coil 216 which, when energized, releases the latched clapper 215.

A control system is provided for controlling operation of the reversible motor 66 which system comprises an electrically operated actuator 218 for the switch members 182, 184, a control switch 220 for the actuator 218 and the magnetic clutch 74 which through a movable sleeve flange 248 operates the switch 220.

The actuator 218 includes a wheel 222 rotatably mounted on a shaft 224 and having equally angularly spaced notches in the periphery thereof to provide alternate high and low cam surfaces 225 and 226 respectively. A lever has an arm 228 connected to the settable switch members 182, 184 and has another arm 230 provided with a rounded end or cam follower 231 which normally engages in one of the notches 226, as shown in FIG. 15, to move the switch members 182, 184 into engagement with contacts 186, 188 respectively. A ratchet wheel 232, rotatable on shaft 224, rotates with the wheel 222 and is operated by a pawl 234 connected to a solenoid actuator 236. The solenoid 236 has a lead 238 connected to the main lead 178 and has another lead 240 connected to a fixed contact 242 of the switch 220. A movable contact member 244 of the switch 220 is carried by a plunger 245 and is biased to open position in engagement with one arm of an operating lever 246. The operating lever 246 projects into the path of flange 248 on the sleeve 250 which is freely slidable along the shaft 72 by the provision of a stud or roller 252 on the shaft 72 and engaging in a slot 253 in and extending longitudinally of the sleeve 250 as shown in FIG. 4.

The magnetic clutch 74 comprises a disc-like driving component 254 affixed onto the driving shaft 70 and a similar driven component 256 secured to one end of the sleeve 250, the components 254 and 256 having closely spaced opposed faces. The magnetic clutch components 254 and 256 may be made of a composition of iron particles and a non-magntic material, such as porcelain, the iron particles being evenly distributed throughout the porcelain. The iron particles are magnetized as permanent magnets in equally and angularly spaced apart areas of their opposed faces to provide each with alternate North and South poles as illustrated in FIG. 14. Normally, the magnetic force between the opposite poles of the magnetic components 254 and 256 will drive the sheet feed rollers 52. However, when the brake 80 is applied to stop the feed rollers, the brake 80 also stops the driven magnetic component 256 whereupon the magnetic drive torque is overcome and like poles of the magnetic components 254 and 256 become effective and the resultant repelling force moves the magnetic component 256 axially along the shaft 72 and closes the switch contacts 242, 244. This pulses the solenoid 236 which retracts the pawl 243 and rotates the ratchet wheel 232 an increment equal to one-half the distance between notches 226 in the wheel 222 which displaces the roller 231 to the adjacent high segment 225 of the wheel 222. This action pivots lever 228 and pivots the switch members 182, 184 from their contact members 186 and 188 respectively to their contacts 192 and 194. When the sets of contacts 182, 186 and 184, 188 are broken, the motor 66 is stopped and the magnetic component 256 then moves back to its normal position proximte its cooperating magnetic component 254 by the magnetic attraction of the opposite poles of the magnets for each other. The switch members 182, 184 are now set for reverse operation of the motor 66.

When a sheet 28 is to be ejected from the machine, the switch member 198 is operated to engage its contact member 202 to energize the relay coil R which is then latched closed under the control of the latch releasing coil 216. When the processing of the sheet 28 in the machine has been completed, the switch member 198 is pivoted back into engagement with its contact member 200. Operation of the switch member 198 may be done manually. In any event, the closing of the switch member 198 with its contact member 200 completes a circuit of the motor 66, the circuit being from main lead 178, contacts 182, 192, lead 208, contacts R1, lead 206, motor 66, contacts 200, 198, lead 210, contacts 194, 184 and lead 180 to ground. This circuit, of course, changes the polarity of the motor 66, causing it to rotate its drive shaft in a direction to feed a sheet 28 upwardly within the sheet guideway for removal by the machine attendant. When the lower edge of the upwardly moving sheet 28 reaches the point where the sheet 28 disengages from the brake arm 168, the spring brake member 164 is released to contract and apply the brake 158 to the shaft 44. As a consequence, the magnetic clutch component 256 is repelled to move along the shaft 72 and flange 248 engages and pivots lever 246 to close the switch contacts 244, 242. The closing of the switch contacts 244, 242 energizes the solenoid 236 which then actuates the pawl 234 to rotate the ratchet wheel through an angular displacement such that the cam follower 231 rides down and stops on the next low portion 226 of the cam wheel 222 whereby the lever arm 228 is biased in a direction to return switch members 182 and 184 respectively to their normal positions engaging contact members 186 and 188. When this occurs a circuit is made through the relay latching coil 216 from the now engaged contacts 184, 188, lead 214, contacts R3, coil 216 and lead 212 to the main lead 178. This causes energization of the latch controlling coil 216 which releases the latch to break the circuit of relay coil R.

I claim:

1. In a line find device for stopping a record sheet at a position corresponding to the location of a line designating slit in a sheet, a sheet guideway, rotatable sheet feed means positioned along said guideway, a stationary brake drum coaxial with said rotatable sheet feed means, a driven brake drum connected to rotate with said rotatable sheet feed means and coaxially positioned relative to said rotatable sheet feed means and to said stationary brake drum, a rotatable sleeve surrounding said brake drums, a helical spring brake member surrounding said brake drums within said sleeve, said spring brake member having one end anchored to said stationary brake drum and having a free end, a brake retracting spring connected to said sleeve and urging rotation of the latter in one direction, said brake retracting spring exerting a force operably to expand and place said spring brake member under a contractile torsion force away from said brake drums, a brake operator rotatable on said stationary brake drum and normally biased in said one direction to an ineffective position, said brake operator rotatable in an opposite direction by a fed sheet to a first position for engagement by an edge of a slit in the sheet and further rotatable in said opposite direction by the sheet to a second position to overcome said brake retracting spring; the improvement which comprises a first lost-motion connection between said sleeve and said brake operator including a first circumferentially extending slot in said sleeve and a lug on said brake operator engaged in said first slot to effect rotation of said brake operator to said first position relative to said sleeve and rotation of said sleeve by said brake operator upon rotation of the latter to said second position, a second lost-motion connection including a second circumferentially extending slot in said sleeve and a tang on the free end of said spring brake member engaging in said second slot, said brake retracting spring holding said spring brake member expanded through the engagement of one end of said second slot with said tang, and a tension spring connecting said tang to said sleeve and urging the tang in a direction to supplement the contractile force of said spring brake member and effective by and upon rotation of said sleeve relative to said tang on rotation of said brake operator to said second position thereof.

2. In a line find device as defined by claim 1 in which said tension spring exerts a force opposed to and less than said brake retracting spring.

3. In a line find device as defined in claim 1 in which said tension spring is carried by said tang having a free end engaging the end of said second slot opposite said one end of said second slot and tensioned by rotation of said sleeve by said brake operator to urge said spring brake member against said brake drums.

References Cited

UNITED STATES PATENTS

| | | | |
|---|---|---|---|
| 1,762,749 | 6/1930 | Tauschek | 197—133 |
| 2,747,717 | 5/1956 | Cunningham et al. | 197—133 |
| 3,211,271 | 10/1965 | Holladay | 197—127 |
| 3,211,895 | 10/1965 | Robbins et al. | 197—127 X |
| 3,247,944 | 4/1966 | Templeton | 197—127 |
| 3,252,557 | 5/1966 | Templeton | 197—127 |

ERNEST T. WRIGHT, JR., Primary Examiner